(12) United States Patent
Lemay et al.

(10) Patent No.: US 6,979,266 B2
(45) Date of Patent: Dec. 27, 2005

(54) METHOD AND APPARATUS FOR DOWNLOADING PERIPHERAL CODE

(75) Inventors: Steven Lemay, Reno, NV (US); James Stockdale, Clio, CA (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/823,833

(22) Filed: Mar. 30, 2001

(65) Prior Publication Data

US 2002/0144115 A1 Oct. 3, 2002

(51) Int. Cl.$^7$ .................................................. A63F 9/24
(52) U.S. Cl. .......................................... 463/40; 463/29
(58) Field of Search ................................ 463/1, 25, 29, 463/40, 41, 42; 713/1, 2, 100; 719/220–222

(56) References Cited

U.S. PATENT DOCUMENTS

| | | | |
|---|---|---|---|
| 4,648,063 A | | 3/1987 | Strout |
| 5,380,008 A | * | 1/1995 | Mathis et al. ............ 273/143 R |
| 5,404,527 A | * | 4/1995 | Irwin et al. ................. 709/222 |
| 5,643,086 A | * | 7/1997 | Alcorn et al. ................. 463/29 |
| 5,702,304 A | * | 12/1997 | Acres et al. ................... 463/29 |
| 5,759,102 A | | 6/1998 | Pease et al. |
| 5,802,592 A | * | 9/1998 | Chess et al. ................. 711/164 |
| 5,903,778 A | * | 5/1999 | Chang ........................ 710/62 |
| 6,052,779 A | * | 4/2000 | Jackson et al. ................ 713/2 |
| 6,078,967 A | * | 6/2000 | Fulghum ...................... 710/2 |
| 6,135,887 A | * | 10/2000 | Pease et al. ................... 463/42 |
| 6,185,678 B1 | * | 2/2001 | Arbaugh et al. ............... 713/2 |
| 6,190,257 B1 | * | 2/2001 | Takeda et al. ................. 463/29 |
| 6,263,392 B1 | * | 7/2001 | McCauley .................. 710/305 |
| 6,263,431 B1 | * | 7/2001 | Lovelace et al. .............. 713/2 |
| 6,266,774 B1 | | 7/2001 | Sampath et al. |
| 6,317,826 B1 | * | 11/2001 | McCall et al. ................. 713/1 |
| 6,394,900 B1 | * | 5/2002 | McGlone et al. ....... 273/142 R |

FOREIGN PATENT DOCUMENTS

| | | |
|---|---|---|
| EP | 1001391 A2 | 5/2000 |
| EP | 1004970 A2 | 5/2000 |
| EP | 1074955 A2 | 2/2001 |

OTHER PUBLICATIONS

Croft et al., Bootstrap Protocol (BootP), Sep. 1985, Network Working Group, Request for Comments: 951, see entire document.*

Newton, Harry. Newton's Telecom Dictionary. N.Y., Flatiron Publishing, 1998. p. 761. 1-57820-023-7.*

* cited by examiner

Primary Examiner—Kim Nguyen
(74) Attorney, Agent, or Firm—Beyer Weaver & Thomas, LLP (57) ABSTRACT

Methods and apparatus for downloading peripheral control code to a peripheral of a gaming device are disclosed. One embodiment of the method includes the steps of providing a peripheral controller adapted to control the peripheral device and a programmable memory associated with the controller, providing a signal for causing control code to be transmitted from a remote location to said peripheral, transmitting the control code to the peripheral, storing the control code at the programmable memory, and executing the code with the peripheral controller to enable the operation of the peripheral device by the peripheral controller. In one embodiment, the control code is transmitted from a data storage device associated with the gaming control device. In one embodiment, the control code is authenticated before it is transmitted to the peripheral, and is verified after being transmitted to the peripheral.

22 Claims, 7 Drawing Sheets

METHOD AND APPARATUS FOR DOWNLOADING PERIPHERAL CODE

FIELD OF THE INVENTION

The present invention relates to peripheral devices and a method and apparatus for providing executable or operational code to a peripheral.

BACKGROUND OF THE INVENTION

In computing environments it is common to associate one or more peripheral devices with a central controller or processor. As one example, electronic gaming machines may include a plurality of peripheral devices, such as a bill validator, a coin acceptor, a ticket dispenser, a video display, and a variety of other devices. These peripheral devices are associated with, and controlled partly by, one or more gaming control units.

Generally, each peripheral also has its own internal controller. This controller may comprise a processor arranged to execute control code, or hardware embodying the control code. The code, whether in the form of executable software or embodied in hardware, controls certain aspects of the operation of the peripheral device. In the example of a gaming machine, the gaming control unit may accept signals from and transmit signals to a bill validator peripheral. The transmitted signals may include control signals such as a signal instructing the bill validator to shut off or cease operation in the event the gaming device security is compromised. The bill validator may include specific code governing the bill validation process, such as code arranged to compare scanned bill image data to a particular set of fixed bill validation data.

In many instances, it is desirable to replace or modify the executable code associated with a peripheral. In those situations where the code is embodied in hardware, this requires that the peripheral be accessed and the hardware entirely replaced. This is both expensive and very time consuming. In the case of a gaming machine, when the machine is out of service for a peripheral code update, significant loss of revenues may occur. In the case where the code is stored in a memory device, such as read only memory (ROM), a new memory module may be installed. Again, this still requires access to the gaming machine.

Finding a potential solution to permitting a change in the code associated with a peripheral is difficult when considering the many varied problems. If the peripheral code is to be updated or replaced, it is desirable to do so in a manner which ensures that the peripheral remains operational. For example, in the event the code is to be over-written to a flash memory, if a power interrupt occurs during the write process, the old code may be sufficiently overwritten, and the new code insufficiently instantiated, to permit the peripheral controller to operate. The entire memory module and/or controller of the peripheral must then be replaced.

When considering gaming machines, security is of utmost concern. Another problem which must be addressed is that of ensuring that any new code provided to the peripheral is not corrupt or tainted.

SUMMARY OF THE INVENTION

Methods and apparatus for downloading peripheral control and operational code to a peripheral of a gaming device are disclosed.

One embodiment of the invention comprises a gaming device for presenting a game for play to a player, the gaming device comprising at least one game control device, at least one peripheral device associated with the game control device, a peripheral controller for controlling the peripheral device, resident code adapted to cause the peripheral controller to obtain control or operational code for controlling the operation of said peripheral device, and programmable data storage for storing control code transmitted to the peripheral device in response to a signal provided to the game control device.

In one embodiment, peripheral control or operational code is stored at a data mass storage device associated with the game control device. In another embodiment, the control or operations code is transmitted from a remote location, such as a remote or central server, over a communications link to the game control device to the peripheral.

In one embodiment, the peripheral is provided with resident code causing the peripheral to identify itself as a download device or otherwise cause control code to be transmitted when the peripheral is not being controlled by previously downloaded control code. In one embodiment, the peripheral is associated with a Universal Serial Bus and the peripheral controller comprises an EZ-USB™ type device.

In one embodiment of the invention, the method comprises the steps of providing a peripheral controller adapted to control the peripheral device and a programmable memory associated with the controller, providing a signal for causing control code to be transmitted from a remote location to said peripheral, transmitting the control code to the peripheral, storing the control code at the programmable memory, and executing the code with the peripheral controller to enable the operation of the peripheral device by the peripheral controller.

One embodiment of the invention comprises a method in which the code which is to be provided to the peripheral is first authenticated. In one embodiment, the authenticity of the code to be provided by the game control device to the peripheral is accomplished with a file verification procedure.

A method of validating the code which has been downloaded to the peripheral is also provided. In one embodiment, the method comprises the steps of the peripheral transmitting the downloaded code back to the game control device or other remote location for comparison against an authentic copy of the control code. In another embodiment, the method comprises the steps of transmitting the control code to the peripheral a second time and the peripheral comparing the originally transmitted and stored code with the second transmitted copy. In yet another embodiment, the method comprises comparing values generated from the code.

Further objects, features, and advantages of the present invention over the prior art will become apparent from the detailed description of the drawings which follows, when considered with the attached figures.

DETAILED DESCRIPTION OF THE INVENTION

The invention is a method and apparatus for downloading peripheral code. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention is a method and apparatus for downloading code or information to a peripheral device. As used herein, the term "code" generally means instructions or other data for use in controlling one or more functions of the peripheral or for operation of the peripheral. This code may comprise executable control code for controlling the operation of the device, and may also comprise operational information such as video data (such as for generation of images) or sound data (for use in generating sound) for use by the device. In one or more embodiments, the code or data may comprise an image file, i.e., the code or data in binary form. Thus, when steps of downloading, authenticating and the like are referred to herein, such actions may apply to the image file comprising the code/data.

Figure 1:
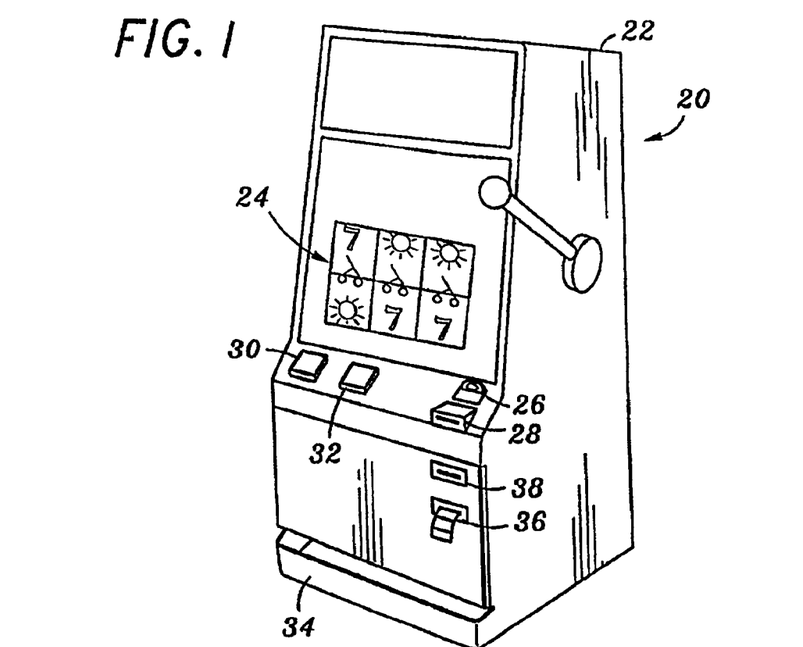
FIG. 1 illustrates one example environment for use of an apparatus and method of the present invention.

The method and apparatus of the invention may be implemented in a wide variety of environments generally comprising "computing" environments, such as personal desktop and laptop computers and electronically and electro-mechanically controlled devices for presenting games. FIG. 1 illustrates the preferred environment to which the invention is applied, that of an electronic gaming device 20.

The gaming device 20 illustrated in FIG. 1 is illustrated as but one example of a device with which the invention is useful. As illustrated, the electronic gaming device 20 includes a cabinet 22 housing a display 24. The display 24 may comprise a video display or one or more mechanically or electro-mechanically controlled devices, such as reels. The display 24 comprises one peripheral of the gaming device 20.

In one embodiment of such a gaming device 20, a player is permitted to play a game once a bet has been placed. In order to place a bet, the player must first provide credit in the form of monies or other elements of value as required by the game operator. In the embodiment illustrated, the gaming device 20 includes a coin acceptor 26 for accepting one or more coins, tokens or the like. In general, the coin acceptor comprises another peripheral device, and may have at least the function of validating presented coins and indicating the value of the accepted coins. The device 20 illustrated also includes a bill validator 28 for accepting paper currency, tickets or the like. The bill validator 28 is yet another peripheral device, and may have at least the function of validating the presented bill monies and indicating the value of the accepted bills.

Once the player has provided the appropriate credit, the player is permitted to place a bet. In one embodiment, the device 20 includes a bet button 30 for indicating the desired bet to be placed. Once a bet is placed, the player is permitted to start the game. In the embodiment illustrated, the game involves the rotation of displayed reels. The player depresses a spin button 32, and the display 24 is caused to display images of rotating reels. This plurality of buttons may be arranged as a peripheral device. Additionally, in the case of electro-mechanical arrangement of rotating reels, these reels may be arranged as a peripheral device. These concepts (downloadable peripherals) may be applied to both video as well as spinning reel type gaming machines.

A player may be paid a winning if the outcome of the game is a particular predetermined outcome as displayed by the display 24. These winnings may be paid by a coin dispenser (not shown) to a coin tray 34. Alternately, the player may be paid winnings in the form of a ticket dispensed by a ticket generator 36. The ticket generator 36 is a peripheral arranged to print a ticket.

Many gaming devices, such as that illustrated, include a card reader 38 for reading information from a player card. This information may be used in a player tracking system, as is well known in the art.

In general, it will be appreciated that a gaming device 20 such as illustrated may include a variety of peripheral devices. These devices may include those described above and/or a wide variety of other devices. It will be appreciated that the present invention is applicable to gaming devices 20 such as that illustrated, and gaming devices arranged to present a wide variety of other games. One or more aspects of the present invention are applicable to devices other than gaming devices to the extent such devices include a computing environment with at least one peripheral associated with a controller or processor. For example, the invention may be applied to machines or devices used in support of gaming machines 20, such as cash validation terminals, progressive controllers and the like. Other peripheral devices to which the invention may be applied include player tracking units, coin hoppers, printers (Dot matrix, thermal or the like), top boxes, light displays, sound systems, reader boards, touch screen controllers, communication devices (modems, Ethernet cards, wireless controllers), secondary video display devices, and button and light/lamp controllers. For example, the code which is provided to a light display may comprise data files for generating images, and the code which is provided to a sound system may include sound files.

Figure 2:
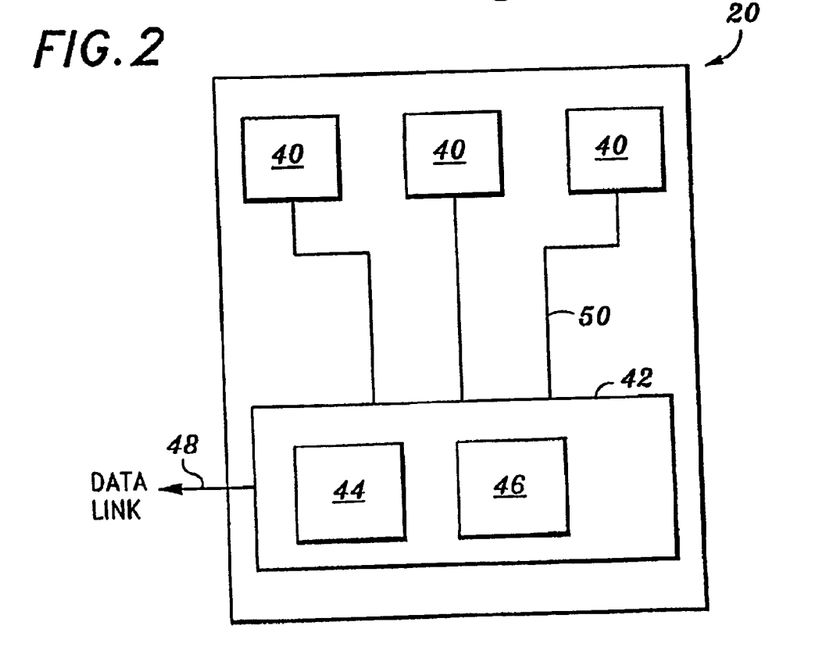
FIG. 2 is a block diagram of a gaming machine in accordance with the present invention.

Referring now to FIG. 2, in a preferred embodiment of the invention, one or more peripheral devices 40, such as those of a gaming machine 20, are controlled by one or more gaming device controllers, such as a master gaming controller 42. In one or more embodiments, the master gaming controller 42 includes a processor 44 and a memory for storing data. In a preferred embodiment, the master gaming controller 42 includes a memory in the form of at least one data mass storage device 46. In one embodiment, the mass storage device 46 is capable of storing data comprising peripheral executable or operational code. As is well known, the mass storage device(s) 46 may comprise a wide variety of devices and mediums capable of storing electronic data, such as hard drives, CD-ROM, floppy discs, tapes, flash memory, RAM and the like. Preferably, these storage devices and remote storage elements employ security and authentication algorithms and hardware to insure the integrity of stored information, such as to ensure the authenticity of the code as described below.

In one embodiment, a communications or data link 48 is provided between the master gaming controller 42 and another device. The other device may comprise a remote server or computer. The data link 48 permits transmission of data to and/or from the master gaming controller 42. The data link 48 may comprise a wired or wireless communications link, e.g. serial, parallel, Ethernet, Token Ring, Firewire®, etc. As stated above, the data link 48 may be useful in transmitting player tracking or similar information regarding play of the gaming device 20 to a remote location.

As is well known, appropriate input/output controllers and devices are provided for permitting data to flow to and from the processor 44 of the master gaming controller 42. In one or more embodiments, at least one bus (not shown) is provided for this purpose. In one or more embodiments, additional hardware and/or software may be provided for permitting communications with the master gaming controller 42 through the data link 48. For example, data may be transmitted through the link 48 using an IEEE-1394 protocol/architecture. In such an embodiment, a physical card including at least one port may be associated with the bus. This card may include hardware and/or software embodying the IEEE-1394 protocol, including physical, link and other layers as defined thereby. The port may be arranged to accept a network wire or cable. In this manner, data may be transmitted from the controller 42 to a remote location, or vice versa, over the link 48. In one or more embodiments, the data may be transmitted in accordance with an Ethernet or TCP/IP protocol, as enabled through a physical card or on-board communications port.

As illustrated, one or more peripherals 40 are associated with the master gaming controller 42. At least one communications or data link 50 is provided between each peripheral 40 and the master gaming controller 42. In one embodiment, the communications link 50 permits data to be transferred between the processor 44 of the master gaming controller 42 and each peripheral 40 via the system bus of the master gaming controller 42. Again, this link may comprise a wired or wireless communications pathway.

Figure 3:
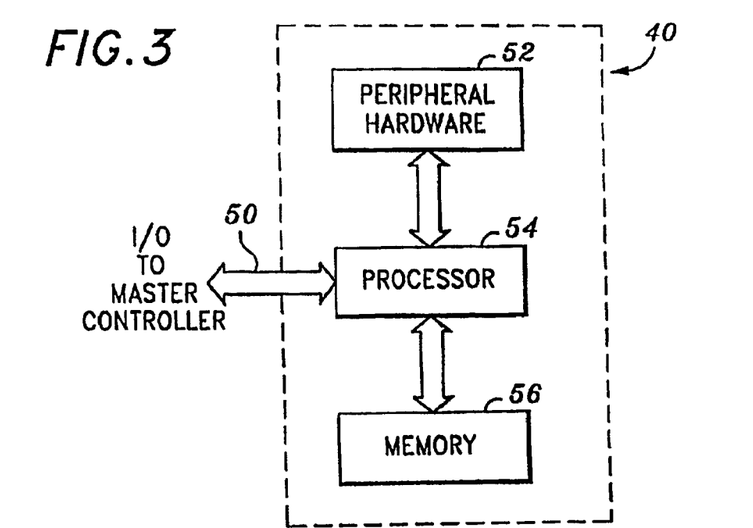
FIG. 3 is a block diagram of a peripheral device in accordance with an embodiment of the present invention.

An embodiment of a peripheral 40 in accordance with the invention will be described with reference first to FIG. 3. As illustrated therein, in one or more embodiments, the peripheral includes hardware 52. The specific hardware 52 may vary dependent upon the nature of the functions to be performed by the peripheral 40. For example, in the case of a bill validator, the hardware may include bill transport and scanning apparatus.

The peripheral 40 also includes a processor or controller 54 and at least one data storage device such as a memory 56. In one embodiment, the processor 54 includes at least one bus (not shown) which permits communication with the peripheral hardware 52 and the memory 56. In general, operation of the peripheral 40, including the peripheral hardware 52, is controlled by code which is processed by the processor 54.

In accordance with the present invention, at least a portion of the peripheral control code can be changed, such as by update or complete replacement. In a preferred embodiment, the peripheral code is downloadable to the peripheral 40, eliminating the need for direct physical contact other than that provided by the wired or wireless link 50 of the peripheral 40 in order to change its control code. In one embodiment, peripheral control or executable code is provided from a remote location, such as the master gaming controller 42. The code is preferably provided through the communications link 50.

In the embodiment where the code is associated with a memory 56, the memory is preferably of the programmable or re-writeable type. In other words, the memory may store first data, and then later store second data at least in part in replacement of the first data. As described in more detail below, such memory 56 may comprise a variety of types of memory devices or modules.

In a preferred configuration of the invention, the peripheral controller 54 comprises a microcontroller selected from the EZ-USB™ microcontroller family available from Cypress Semiconductor Corporation of San Jose, Calif., or is similarly arranged. In this embodiment, the master gaming controller 42 includes a Universal Serial Bus (USB) to which the peripheral 40 is connected. In this arrangement, a USB may be associated with the bus of the master gaming controller 42. The USB may include hardware and software, including a USB controller and at least one port for connection of a communication cable through which data may flow between the peripheral 40 and master gaming controller 42. The protocol and architecture of a USB is well known and will not be described herein. Such information may be found in the text USB Hardware and Software, ISBN 0-929392-37-X, which is incorporated herein by reference.

In such an embodiment, the peripheral controller/processor 54 includes, among other things, a control chip or USB interface engine/processor, an internal memory, a data bus, and an address bus. The processor is pre-programmed or coded to perform reset and enumeration functions. In accordance with these functions, when power is applied to the controller 54, a reset function is held in an asserted state, preventing the controller from executing other instructions. At the same time, the controller 54 is identified on the USB as a download type device. In response to this identification, the master gaming controller 42 is preferably adapted to obtain peripheral control code for the peripheral 40 and send it to the peripheral 40 via the communication link 50. As described in more detail below, this code may be stored at the mass storage 46 of the master controller 42, or be stored at a remote location. In the event the code is stored at a remote location, the master gaming controller 42 first obtains the code and then sends it to the peripheral 40. As described in more detail below, in a preferred embodiment, before the code is transmitted to the peripheral 40, it is authenticated.

The master controller 42 provides the peripheral control code to the peripheral 40. In this embodiment, direct memory access is preferably provided, such that the code is stored directly to the memory 56 without intervention by the controller 54. In other embodiments, the code may first be provided to the controller 54 and/or a local memory thereof, and then be forwarded for storage to the memory 56. Once the code has been downloaded and stored, a command is sent to the USB interface engine forcing the controller 54 to disconnect from the USB. At this time, the controller 54 reset function is released and the controller 54 begins executing the code which was downloaded and stored in the memory 56. Preferably, when executed, the downloaded code initializes the peripheral 40 and enables the peripheral 40 to enumerate itself as a particular device. Once this has occurred, the USB interface engine reconnects to the USB and now identifies itself as a particular device, i.e. a bill validator, coin acceptor or the like. During the remainder of a session, the peripheral 40 is enabled to be used as part of the gaming device 20.

In an embodiment where the peripheral controller 54 comprises an EZ-USB™ type device, the controller 54 includes a number of other features. For example, the controller 54 may include an I²C™ controller which communicates with the USB engine through a data bus. This controller is adapted to permit local communications, as is well known.

In this embodiment, the peripheral 40 may include two memory devices. In one embodiment, the peripheral 40 may include an internal memory, such as 4 or 8 Kb of RAM. This internal memory may be associated directly with the controller 56 and include a code for performing the reset and other functions described above. In the preferred embodiment of the invention, the memory 56 is external and is in addition to an internal memory. In one embodiment, the memory 56 comprises 32 Kb, 64 Kb or more of additional memory. As described below, the exact type of memory may vary.

In another embodiment of the invention, the peripheral controller 54 again includes a processor and memory. Fixed code is resident at the peripheral 40. This code may be embedded in hardware, such as part of a control chip, or stored in the memory 56. In response to an identification inquiry from the processor 44 or other device associated with the master gaming controller 42, the fixed or resident code is arranged to cause the peripheral controller 54 to cause the master gaming controller 42 to download peripheral control code in like manner to that described above.

In this embodiment, the peripheral controller 54 may be associated with the master gaming controller 42 in a wide variety of manners. For example, the communication link 50 may be provided by other means or protocols than USB, such as a serial connection, including serial RS-232 and RS-422, or a parallel connection.

Figure 4:
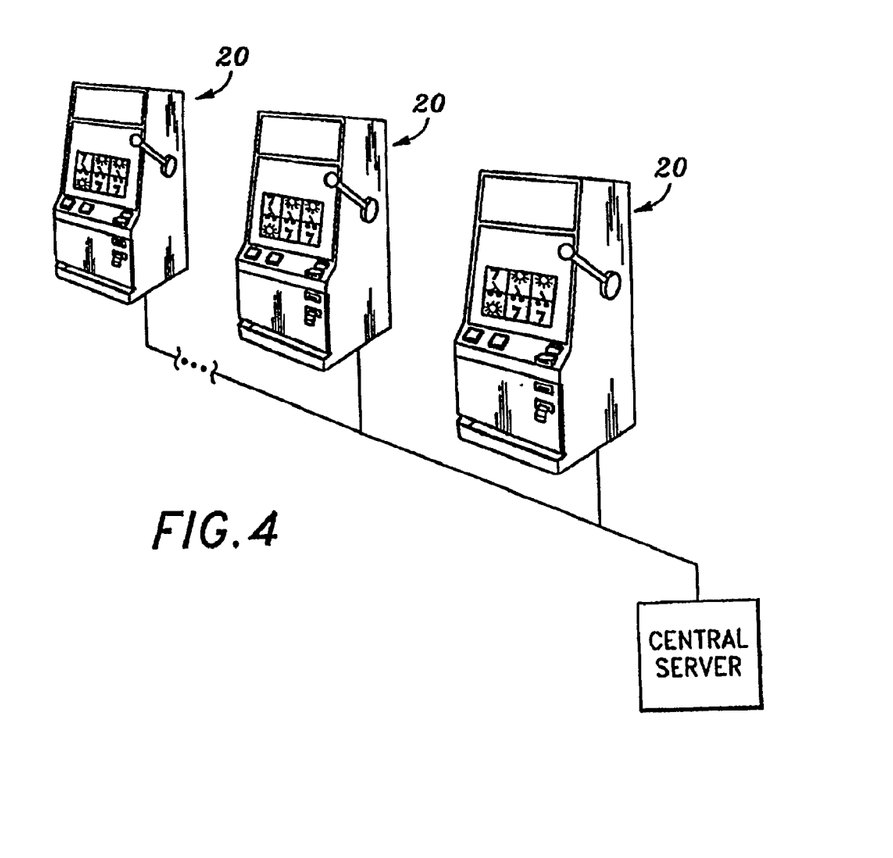
FIG. 4 is schematic of a grouping of gaming machines such as illustrated in FIG. 2 in a network arrangement.

As stated above, in one embodiment of the invention, peripheral control code is provided by the master gaming controller 42. In one embodiment, the code is stored at the mass storage 46 of the master gaming controller 42. In another embodiment, as illustrated in FIG. 4, the code may be stored at a remote location, such as a central server. In the embodiment illustrated in FIG. 4, the master gaming controller 42 (shown in FIG. 2) associated with several gaming machines 20 is in communication with the central server via one or more communication links.

In an embodiment where the code is stored at a remote location, the master gaming controller 42 may be arranged to obtain the code in response to an instruction/identification by the peripheral controller 54. In the event the peripheral controller 54 requests the code, such as by identifying itself as a download device, the master gaming controller 42 may be arranged to send a request for the code to the remote device, causing the remote device to transmit the code. This code may be stored at the mass storage 46 of the master gaming controller 42 or in a volatile memory, such as RAM. The master gaming controller 42 may then re-transmit the code on to the peripheral 40. In one embodiment, the code may be stored at a remote code repository, and transferred to a local system and then the gaming device 20 or directly to the gaming device. Firmware may be provided which allows the operator to designate the source and manner of obtaining the code.

The memory 56 of the peripheral 40 may comprise a wide variety of elements such as static RAM, Dynamic RAM, Synchronous Dynamic RAM, FLASH ROM and EPROM. In a preferred arrangement of the invention, the memory 56 associated with the peripheral 40 comprises one or more static RAM chips or similar elements, rather than EPROM or FLASH ROM device. When information is stored to an EPROM or FLASH ROM, complex algorithms must be performed to write the data to the device. On the other hand, data may be written to the static RAM using a simple bus write cycle. This permits data to be written to the peripheral 40 in a much faster fashion. For example, the difference in write time may be nanoseconds versus milliseconds. In the gaming environment, this write time is very important. First, during transmission of the code, the download process is susceptible to interruption and interference. This may corrupt the code, requiring that the code be re-transmitted. The additional time required to write or store the code also limits the maximum rate of transmission. In the event code is simultaneously forwarded from the master gaming controller 42 to several peripherals 40, these delays increase the time the gaming device 20 is not operational. During a long transmission cycle, the opportunity for interception of the data also increases. This increases the likelihood that a party may intercept the code and retransmit unauthentic code to the peripheral device 20.

In one or more embodiments, the peripheral memory 56 at which the control code is stored is a volatile memory which loses its ability to store data upon the occurrence of one or more events. In one embodiment, the memory is of a type which loses is ability to store data when power is interrupted thereto. In accordance with this embodiment, in the event of an interruption in power, the peripheral's control code is effectively erased, necessitating that the control code be obtained again. This arrangement has several benefits. During a power interruption, the security of the gaming device 20 may be compromised. Even if a party attempts to tamper with a peripheral 40 of the device 20, when power is again provided to the device, the control code for each peripheral 40 is reloaded from an authentic source (or is authenticated, as described in greater detail below), ensuring that the peripheral 40 operates as desired.

In addition, the master gaming controller 42 may be arranged to shut off power to a peripheral 40 or otherwise "reboot" the peripheral in the event of a security breach. For example, a party may open an access door to an interior of the gaming device 20. If such a breach is detected (such as with a door sensor), the security event may be identified to the master gaming controller 42. The master gaming controller 42 may, in turn, shut power off to the peripheral 40. This erases the code from the peripheral's memory 56, rendering the peripheral useless for operation of the gaming device 20 and thwarting an attempt by the intruder/unauthorized person. Once the device 20 is again identified as secure, the master gaming controller 42 may again permit power to be provided to the peripheral 40. At that time, the peripheral 40 is arranged to download the code again or take other appropriate action.

As one aspect of the invention there is provided a method for verifying the code once downloaded to the peripheral 40. As stated above, it is desired that an authentic version of the peripheral code be accessible, whether provided from a central or remote server or stored directly at the master gaming controller 42. Such an authentication method is described below. In accordance with the invention, a means is provided for verifying the integrity of the code which is provided to the peripheral.

In one embodiment, once peripheral control code has been downloaded to the peripheral 40, the code is provided to the peripheral a second time. The peripheral 40 utilizes this second copy of the code in a verification procedure, comparing the stored first copy to the newly transmitted second copy. If differences are found between the two versions of the code, then the version of the code which was downloaded and stored is not deemed authentic. The controller 54 of the peripheral 40 may then be arranged to request a new, third copy of the code for download and storage in replacement of the code which is currently stored, and verification procedure may repeat. In this embodiment, the second copy of the code is not stored permanently at the peripheral 40, but is only used in a comparison procedure. As is well known, this comparison procedure may comprise a bit-for-bit comparison or other method of verification now known or later developed. Of course, in this embodiment, the controller 54 of the peripheral 40 is provided with code arranged to cause the peripheral 40 to re-request the code after it has been stored, and to utilize this second requested copy of the code in the verification process.

In the above-referenced embodiment of verification, the peripheral 40 is adapted to perform the verification function. Of course, in that arrangement, the peripheral 40 must have sufficient computing power to perform the operation, and must be provided with either the software or hardware to perform the verification.

In another embodiment, the peripheral 40 is provided with code which is capable of calculating a signature associated with the code. This signature may be transferred back to the master gaming controller 42 for comparison against a signature similarly generated against the copy of the code stored there. If the signature match, the code is deemed verified. If not, the code is not deemed verified.

In another embodiment, once the code is downloaded to the peripheral 40 and stored at the peripheral 40, the peripheral 40 sends the code back to the master gaming controller 42 or other device. In the embodiment where an authentic copy of the code is stored at the master gaming controller 42, the code is sent back to the master gaming controller 42 and the master gaming controller 42 performs a verification function, comparing the authentic code to that forwarded by the peripheral. This arrangement has the benefit that the verification function can likely be performed more quickly and without interruption of other functions, as the master gaming controller 42 is likely to be provided with much greater processing power and data storage.

In either embodiment, the verification function is useful in detecting the corruption of the peripheral code. For example, a party may attempt to intercept code being downloaded to a bill validator peripheral. The intercepted code may be modified or replaced with other code, such as code which permits the user to pass counterfeit bills through the validator. The code may also be corrupted during the transfer, such as by electrical interference.

In one or more embodiments, the code verification may occur at various time intervals after downloading of the code. This assures that the code is not later tampered with at the peripheral 40.

In one or more embodiments, the data which is transferred in order to enable the peripheral and perform the verification or other functions may be encrypted. For example, the code which is downloaded to the peripheral 40 may be encrypted to further ensure its integrity. A variety of encryption methods and means for implementing these methods are known to those of skill in the art.

Figure 5:
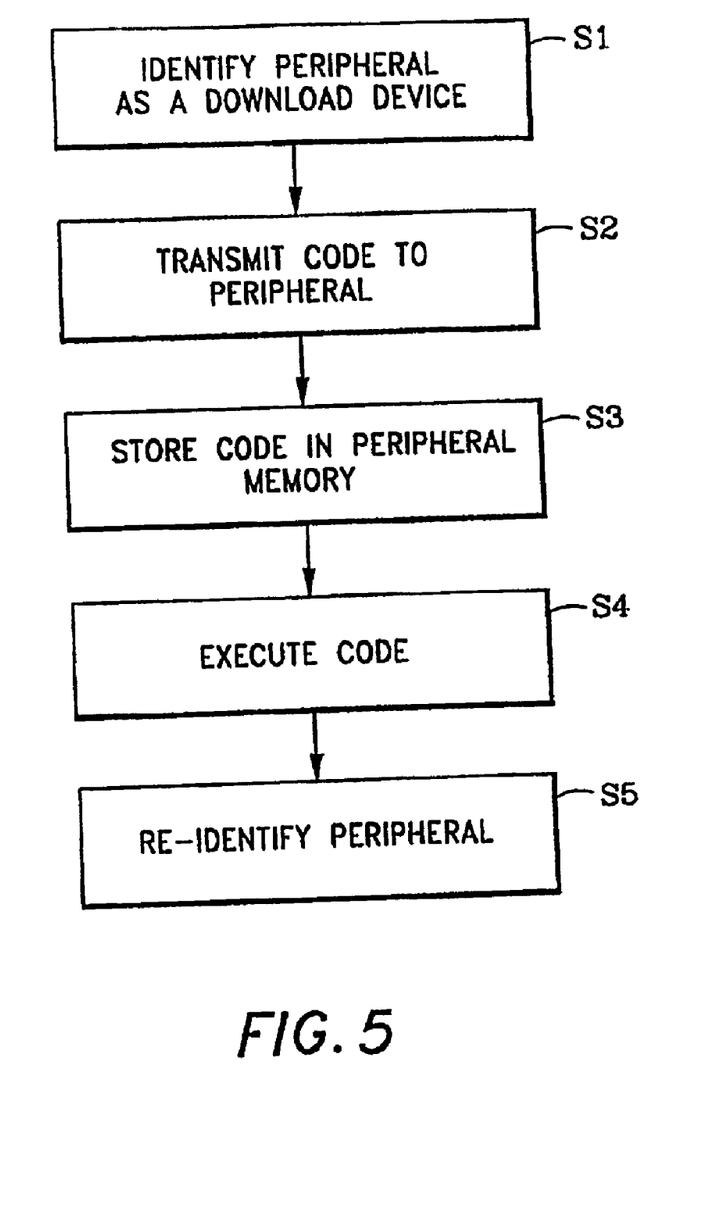
FIG. 5 is a flow diagram illustrating a method in accordance with an embodiment of the invention.

A method in accordance with the invention will be described with reference to FIG. 5. In one embodiment, in a first step S1, the peripheral identifies itself as a download device. In the embodiment where the peripheral 40 is associated with a USB device, when the peripheral 40 is connected to the USB, a voltage change occurs on one of two connecting wires. This causes the USB controller to query the peripheral 40 to determine its nature. In accordance with this embodiment of the invention, the USB engine or processor 54 of the peripheral 40 is arranged to identify itself as a "download" device requiring code for its operation. As stated above, in another embodiment the peripheral 40 identifies itself as a download device by executing resident code which instructs the master gaming controller 42 to download control code to it. In one or more embodiments, this first step S1 comprises the step of the peripheral 40 transmitting a signal to a remote location, such as the master gaming control 42, causing control code to be transmitted to the peripheral.

In a step S2, control code (such as in the form of an image file) is downloaded to the peripheral 40. In one embodiment, the code is provided directly from the master gaming controller 42. In another embodiment, the code is forwarded from a remote location to the master gaming controller 42, and then from the master gaming controller to the peripheral 40.

In a step S3, the control code is stored in the memory 56 of the peripheral. As stated above, the code may be stored directly in the memory 56 or first pass through the peripheral controller 54.

In a step S4, after the code has been received and stored by the peripheral 40, the code is executed, such as by the peripheral controller 54.

In a step S5, the peripheral 40 begins its normal operation in accordance with the executed downloaded code. In the embodiment where the peripheral 40 is a USB type device, this includes the step of the peripheral 40 disconnecting from the USB and then reconnecting. After the reconnection, the USB controller of the USB associated with the master controller 42 polls the peripheral 40. Now using the downloaded control code, the peripheral 40 identifies itself as the particular intended device, such as a bill validator, coin acceptor or the like. In another embodiment, once the control code is downloaded and stored, a jump code causes the peripheral to begin executing the control code, enabling operation of the peripheral device.

In one or more embodiments, the method includes the step of conducting code verification. In the embodiment of the invention described above where some fixed code is resident at the peripheral 40 instructing the download, this step may occur after the code has been downloaded and stored at the peripheral 40, but before the code is executed thereby (i.e. between steps S3 and S4 of the method illustrated in FIG. 5). In the embodiment where the peripheral 40 includes a USB engine or processor 54, verification is part of the downloaded code and occurs in conjunction with the code execution (i.e. at step S4). As stated above, the step of verification may comprise the step of resending the code for bitwise comparison by the peripheral 40, comprise the peripheral sending a copy of the code back to the master gaming controller 42 or other location for comparison, or comprise comparison of generated signatures.

In one or more embodiments, the method of the invention is applied to operational code and/or data. In such event, the informational data is supplied to the peripheral and used (i.e. executed) by the peripheral for controlling a display, sound generating device or the like.

As stated above, in a preferred embodiment of the invention, the code which is provided to the peripheral 40 is authentic. One embodiment of the invention thus includes a method of authenticating the code which is to be provided to the peripheral, such as authenticating the code which is stored at the gaming device 20. Preferably, the authentication of the code occurs before step 2 of the method described above and illustrated in FIG. 5, such that the authenticity of the code is ensured before it is provided to the peripheral. As described above, once the code is provided to the peripheral, the code may be further verified to ensure its integrity after its transfer to the peripheral.

In one embodiment, the code or other media to be authenticated contains authentication data, in one embodiment in the form of an authentication file. The authentication data comprises data generated at a secure location from trusted software, i.e. software that is known to be accurate and in some instances software that is approved by a regulatory body. In one embodiment the authentication data stored in the authentication file is in the form of a file verification table (FVT) configured to store a hash value entry for each file. To create the hash value entries stored in the FVT, hash operation algorithms stored on a secure memory are executed on each file stored on the media (fixed, removable, or any other) and the resulting hash value is stored in the FVT such that it in some way corresponds with the software file from which it was created. The FVT thus contains a unique value created by the hash operation for each file on the removable media.

Figure 6:
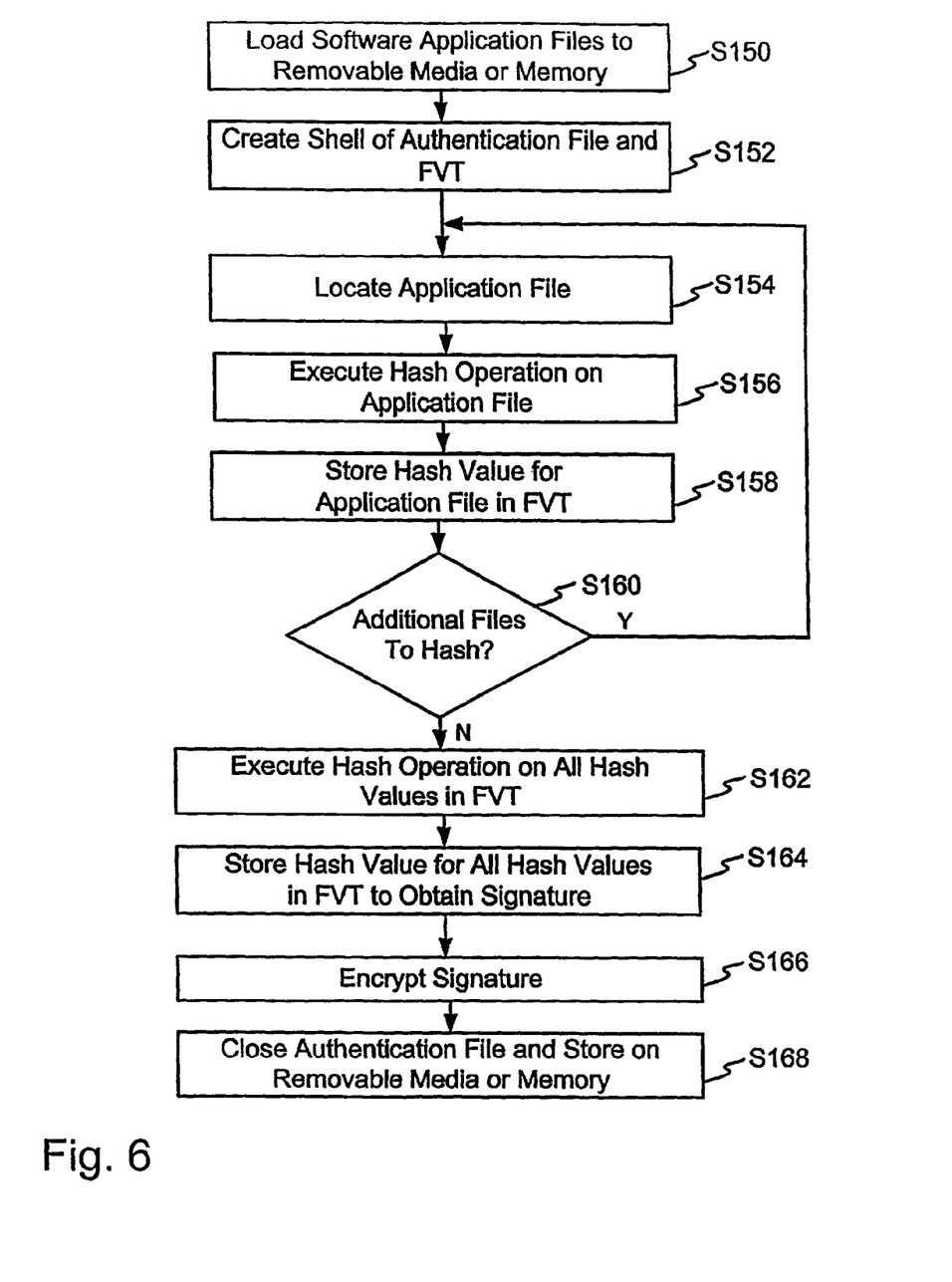
FIG. 6 illustrates an operational flow diagram of a method of authenticating code which is provided to a peripheral in accordance with an embodiment of the invention.

FIG. 6 illustrates an operation flow diagram of an example method of creating the authentication file. This method is one exemplary method of operation and it is contemplated that other methods of creating authentication data may be utilized. Further, this method is available for use on any of a removable media, fixed or mass media, software stored on a network, or other any other data storage apparatus. For example, the method is available for authenticating peripheral code which is stored on a removable CD-ROM associated with the master gaming controller 42. The method is also available for authenticating peripheral code which is stored at the mass storage device 46 of the master gaming controller 42.

At a step S150 the authentication data creation process loads software application files, such as the peripheral control code or video/audio peripheral operational data to a removable media. In other methods, the software may comprise files other than application files and the files may be loaded on the media prior to the initiation of this process. Next, at a step S152, the operation creates a shell file that will become the authentication file storing the FVT.

At a step S154, the operation locates an application file. The process of locating the one or more files may occur in any manner known in the art. One such method comprises selecting an application file based on directory structures, while another method comprises selecting application files alpha-numerically. Once the first application file is selected, the operation executes a hash operation on the selected application file. The hash operation may comprise any hash operation capable of returning a unique value for a particular file. To facilitate a check at a later state of the authentication process, the hash operation used in obtaining the hash values for the FVT is preferably generally similar to the hash operation used in later stages of authentication. Using the same algorithm insures that a given file will yield an identical hash value if the file has not been altered.

Thereafter, at a step S158, the operation stores the hash value in the FVT. In one preferred embodiment the hash value is stored with an association with the application file from which the hash value was created. Next, at a decision step S160, the operation determines if there are additional files on the media to execute the hash operation. If there are files for which a hash value has not been created, then the operation returns to step S154 and the operation repeats. If at decision step S160 the operation determines that no additional files exist on which to perform the hash operation, then the operation progresses to a step S162 and the method executes the hash operation on all hash values presently stored in the FVT. The hash operation creates a unique hash value for the hash values stored in the FVT to provide means to detect tampering or unwanted alteration of the hash values in the FVT. This hash value generated by executing the hash operation on the stored hash values is referred to herein as a content signature of the hash values. Next, at a step S164, the operation encrypts the content signature, stores it in the FVT; then, the operation hashes the entire FVT file and obtains a signature for the entire FVT file.

Next, at a step S166 the operation encrypts the signature value and stores it in the FVT. In one embodiment this value, the encrypted signature value for the FVT is appended to the end of the file. Encryption of the signature prevents the alteration of the signature, thereby providing additional security against tampering. At a step S168 the operation closes the authentication files and stores the authentication file on the removable media or other location, such as the mass storage 46 of the master gaming controller 42. The FVT within the authentication file is thus available if the removable media or other memory/file is used in the future. The FVT contains unique data created based on the content of the removable media when the content of the removable media was known to be trusted as accurate.

In other configurations, the FVT is created or stored on media other than the removable media, such as a fixed media like a hard drive, to provide authentication capability.

Figure 7:
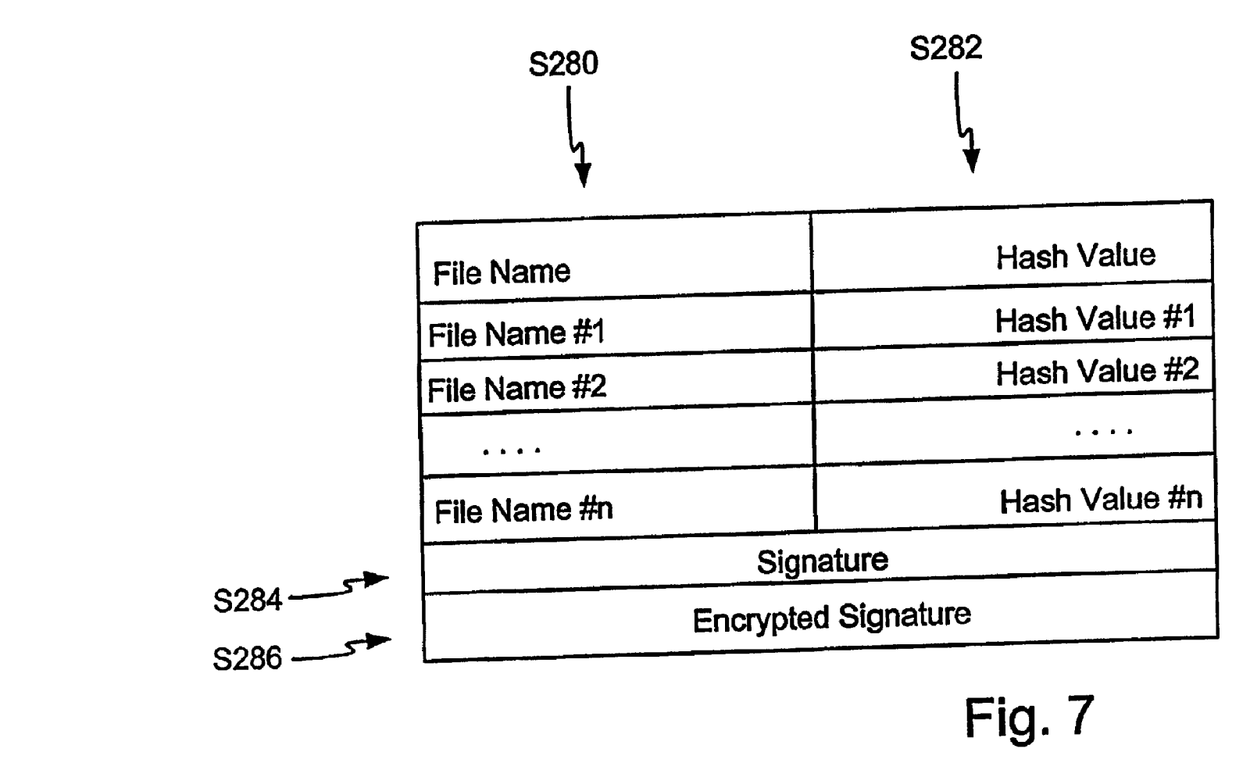
FIG. 7 illustrates an exemplary format and content of a verification file.

FIG. 7 illustrates an example configuration of a file verification table (FVT) as contained within the authentication file. In this example configuration, the FVT contains a listing of each file 280, identified by name. Associated with each file is the hash value 282. The hash value is the unique value created by executing the hash operation on each file 280 associated with the removable media. The FVT also contains an encrypted content signature 284 which is an encrypted hash value obtained from executing the hash operation on each of the hash values 282. The FVT also contains an encrypted file signature 286. This is but one possible arrangement and exemplary content of data to assist in the authentication of software or data contained on a media for use in a device. Those of ordinary skill in the art will understand that other arrangements are possible without departing from the scope of the invention. The FVT may be stored on the media with which it is associated or at a different location.

Once the above described authentication file is on a media (fixed, removable, or other) it provides a unique key to determine if the software on the media (such as the peripheral control code file or data file containing audio/video or other peripheral operational data) has been altered since the authentication file was created. The media or files/data can then be put to any use intended and using the authentication file a determination can be made whether the software on the media has been altered. The authentication process is described below.

Figure 8A:
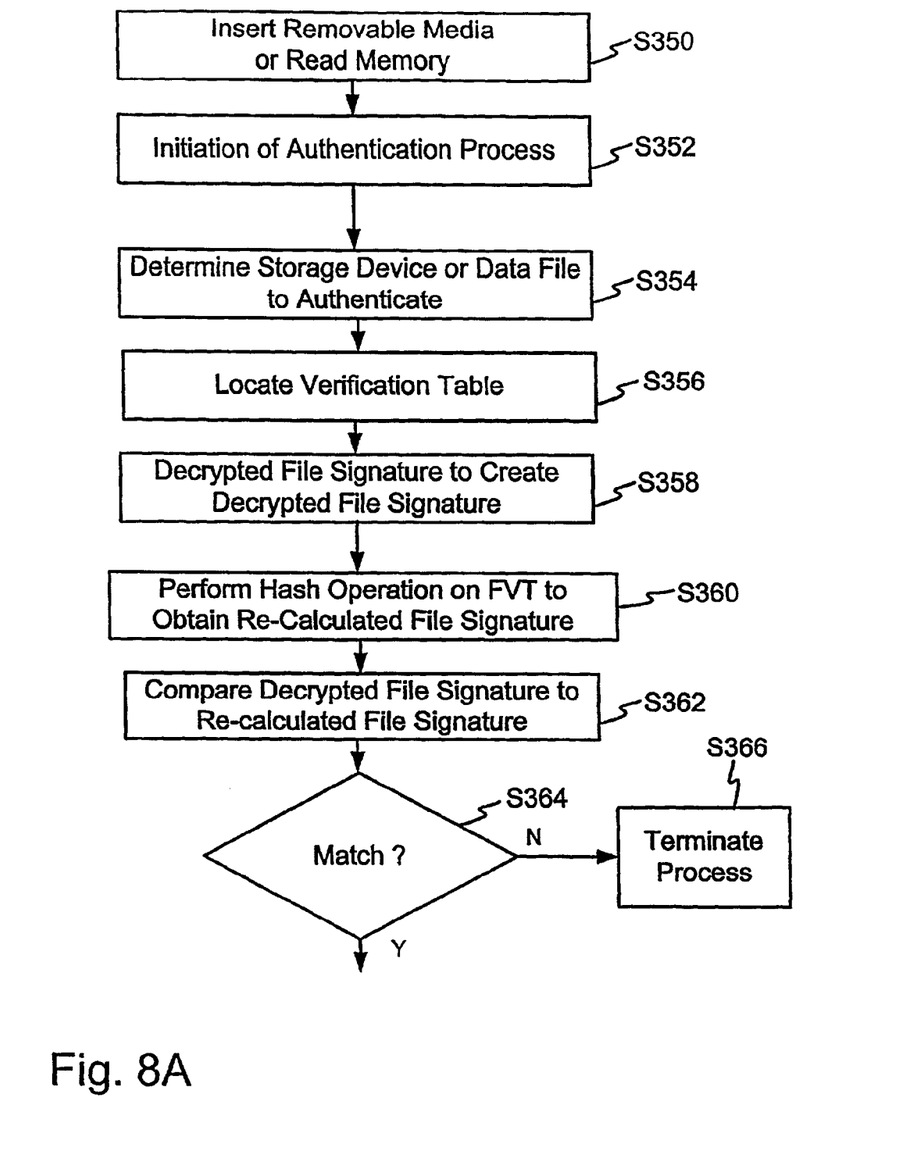
FIGS. 8A AND 8B illustrate an operational flow diagram of an exemplary method of authentication of the invention.
Figure 8B:
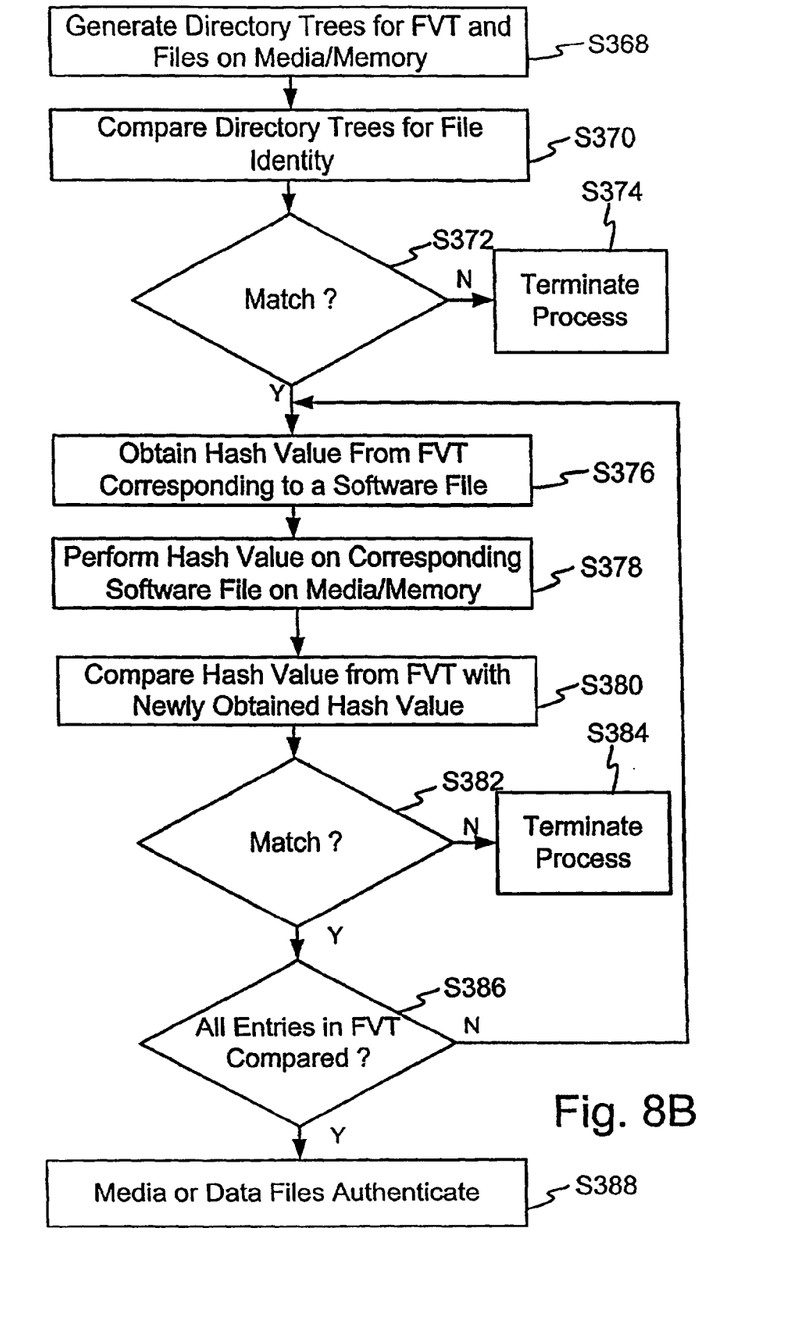

FIGS. 8A and 8B illustrate an operation flow diagram of an exemplary method of authentication. In one environment, this method is performed, for example, to establish that the software control code (such as in the form of one or more image files) on the gaming controller 42 is authentic. The method described below is in reference to authentication of a removable media, such as a CD-ROM containing the peripheral code. In reference to FIG. 8A, at a step S350 a user inserts a removable media into a removable reader (such as a CD-ROM drive). Thereafter, at a step S352 the process of authentication can automatically occur or require some event from a user. At a step S354 the operation determines a media to authenticate. Any order of authentication is acceptable. As described, in a preferred embodiment of the invention, the authentication may occur on one or more files used to control a peripheral device that may be stored anywhere.

Next, at a step S356, the operation searches the media for the verification file stored on the media. The creation and content of the verification file is discussed above. At a step S358, the operation utilizes the decryption algorithms from the secure memory to decrypt the file signature stored in the FVT. The encrypted file signature is shown as element S286 on FIG. 7. After decrypting the file signature value stored in the FVT, the operation performs a hash operation on the FVT file up to the encrypted content signature S284 (see FIG. 7), to obtain a re-calculated file signature. This occurs at a step S360. Thereafter, at a step S362, the operation compares the decrypted signature to the re-calculate file signature to check for differences in the values. At a decision step S364, a determination is made whether the signatures match. If the decrypted signature does not match the re-calculated signature, the operation progresses to a step S366 and the process terminates. Such a failure to match at step S364 indicates possible tampering or alteration and the installation or game operation should not occur or may have occurred inaccurately.

If at decision step S364 the operation determines the decrypted signature matches the recalculated signature, the operation progresses to a step S368 wherein the operation generates a directory tree or other directory and/or file listing of the files on the media and the FVT. Any various structure or listing of directories and/or files can be utilized such that it facilitates a comparison between the directory trees or structure and/or the files on the FVT and the media. This comparison, that occurs at a step S370 indicates whether the same directories and/or files exists on the media as compared to the listing in the FVT as was recorded at a prior time when the media content was known to be trusted. At a decision step S372 the method determines if there is a match between the directories or files recorded in the FVT and the directories or files currently on the media. If there is not a match, the operation moves to a step S374 and the process terminates.

If there is a match at step S372, the operation progresses to a step S380. At step S380, the operation begins performing the hash operation on each file stored on the media and comparing the resulting hash value to the hash value stored in the FVT. Thus, at step S380 the operation obtains a hash value corresponding to a file. The hash value is obtained from the FVT. Next at a step S382, the operation locates the corresponding file on the media and performs the hash operation on the file. It is preferred that an identical hash function be utilized at step S382 as was used to create the entries in the FVT.

At a step S384, the operation compares the hash value from the FVT to the re-calculated hash value for the corresponding software file stored on the media. At a decision step S386 a determination is made as to whether these two hash values match. If the values do not match, the operation moves to a step S388 and the process terminates. If the values match, the operation moves to a decision step (not shown) wherein the operation determines if all the entries of the FVT have been compared to re-calculated values.

If at the decision step there are additional FVT entries to compare, the operation returns to step S380 and the operation repeats as shown. if at the decision step all the FVT entries have been compared to re-calculated entries, the operation progress to a step wherein the determination is made that the media (such as peripheral control code files) has been authenticated. It is contemplated that this process can occur on any media (including control code files, operational data such as audio/video data) for which authentication is desired. It is further contemplated that many other variations may be made to the general process outlined herein without departing in scope of authentication to determine that the software control code on the media, fixed, removable, or otherwise, is trustworthy.

One or more embodiments of the invention comprise a method of updating the control code of a peripheral 40 while the peripheral 40 is operating using already provided code. For example, a bill validator may be provided with particular code enabling its operation as part of a gaming device. During the continued operation of the gaming device, it may be determined that the code of the bill validator must be changed, such as to accommodate a change in currency format or by operator request. In accordance with an embodiment of the invention, this process may occur without powering down the gaming device. In particular, the new control code may be provided to the master gaming controller 42 through a download process. The master gaming controller 42 may then send a signal to the peripheral 40 instructing it to accept the new code in a download process, overwriting the old code. In one embodiment, the master gaming controller 42 may be caused to disconnect the peripheral 40, effectuating a "reboot" in which the peripheral 40 now identifies itself as a download device again, starting the process at step S1 of the above-described method. The reboot process may automatically include the above-described authentication process.

One or more embodiments of the invention comprise the operation of a gaming device including a peripheral 40. In one embodiment, the method includes the step of initiating operation of the gaming device 20. This step preferably includes the step of providing the control code which the peripheral 40 will use to operate, in accordance with the above-referenced method. The initiation step may include shutting off power to the peripheral 40, and/or master gaming control 42 or entire gaming device 20, and then providing power again. As disclosed above, in the preferred embodiment, shutting off the power to the peripheral 40 causes the previously stored control code to be erased. When power is again provided to the peripheral 40, the peripheral 40 preferably transmits a signal, such as the above-referenced data identifying the peripheral as a download device, such that the control code is transmitted to the peripheral for storage and then execution. In one or more other embodiments, the initiation of operation may comprise only rebooting the peripheral 40 (such as by triggering the reset/enumeration function of the peripheral) causing the master gaming controller to recognize the peripheral as a download device and provide the control code which will be used to control its operation. This rebooting may be accomplishing in a variety of manners. For example, a signal may be sent from the master gaming controller 42 causing the peripheral 40 to initiate a reset or reboot function.

In one or more embodiments, the peripheral 40 may be caused to erase its stored control code in the event a reboot function is executed. In such event, the resident control code is erased, and the peripheral seeks new control code for storage and execution. In another embodiment, the resident control code may simply be overwritten.

Many advantages are realized by the invention. In accordance with the invention, code for operation/execution by a peripheral device may be conveniently updated without needing to access the peripheral device.

A method of providing code to a peripheral is provided which ensures the integrity of the code. The method ensures that the code which is downloaded to the peripheral is not corrupt or tampered with.

In accordance with the invention, a method and apparatus is defined which ensures the integrity of the code download procedure without risk of peripheral inoperability. As described above, one problem associated with updating the control code of a device is that an interruption may occur during the code write procedure. In such event, the device may be rendered inoperable. The resident peripheral control code may be sufficiently overwritten before the interruption that the resident code is not sufficient to operate the device after the interruption to permit the download to continue or restart. In addition, the new code may be insufficiently written to permit its execution for controlling the device, again preventing the device from completing the code install.

As will be appreciated, interruptions during such a code installation may arise from a wide variety of sources and are not uncommon. In the realm of gaming device, such interruptions may occur due to network instability electric shock and interference and other factors.

In accordance with the invention, such an interruption will not render the peripheral inoperable. In the preferred embodiment of the invention, the peripheral includes fixed code which can not be overwritten and always enables basic operation of the peripheral. In a preferred embodiment, the fixed code is only that code sufficient to enable the peripheral 40 to communicate with the master gaming controller 42 to obtain control code via the download process. In another embodiment, as described in detail above, the peripheral 40 identifies itself as a download device and accepts code from the master gaming controller 42 which enables further operation of the peripheral 40.

Another advantage of the invention is that all of the code for controlling all of the peripherals of a gaming machine can be authenticated and delivered to the peripherals for enabling operation of the machine at the same time. For example, a gaming machine may be manufactured and then delivered with firmware or have the firmware uploaded or installed once delivered. This entire block of firmware may be authenticated at once. Then, the code for all of the peripherals of the device may be installed from the firmware, enabling operation of the machine.

The method of the invention is useful in ensuring that the code associated with the operation of peripherals of many computers are all updated. In one embodiment, the gaming controller may be provided with code which it provides to the peripheral. In accordance with the verification method(s) as described above, it may be determined if the provided code matches that which the peripheral is currently utilizing. If not, then the gaming controller/peripheral may be caused to automatically update the operating code by accepting the new code. This method ensures that one or more peripherals of a gaming machine are not operating with old code.

The method of the invention is useful in authenticating many types of code or data, such as may be used by a video display or sound generating peripheral of a gaming machine. Further, the method is useful in updating this code and/or data to the peripheral. In this manner, a wide variety of information associated with the operation or control of a peripheral of the gaming machine may be authenticated, verified, and updated.

It will be understood that the above described arrangements of apparatus and the method therefrom are merely illustrative of applications of the principles of this invention and many other embodiments and modifications may be made without departing from the spirit and scope of the invention as defined in the claims.

We claim:

1. In a gaming machine having a gaming machine controller and a peripheral device with an associated device controller and a data storage device, said gaming machine adapted to play a game for a player once a bet has been placed and to pay a winning to the player for at least one particular predetermined outcome of the game, a method of providing operating code to said peripheral device, comprising:

initiating operation of said gaming machine;

transmitting a first signal from said peripheral device to said gaming machine controller;

transmitting new operating code to said peripheral device in response to said first signal, said new operating code adapted to control the operation of said peripheral device and containing a least a portion of code that is different from any operating code previously used by said peripheral device;

storing said new operating code at said data storage device of said peripheral device; and executing said new operating code with said device coniroller of said peripheral device to enable the operation of said peripheral device.

2. The method in accordance with claim 1, wherein said peripheral device includes minimum resident code enabling said peripheral device to transmit said first signal, said minimum resident code being insufficient to enable the complete operation of said peripheral device, and wherein said transmitted new operating code comprises code utilized to enable the comlete operation of said peripheral device.

3. The method in accordance with claim 2, including the steps of:

resetting said peripheral device;

removing previously existing operating code from said peripheral device; and utilizing said resident code to transmit said first signal to obtain said new operating code for said peripheral device.

4. The method in accordance with claim 3, wherein said resetting step includes removing power to said peripheral device and then providing power to said peripheral device.

5. The method in accordance with claim 1, including the step of:

sending a polling signal from said gaming machine controller to said peripheral device, wherein said step of transmitting said first signal is made in response to said polling signal.

6. The method in accordance with claim 1, wherein said peripheral device is selected from the group consisting of: a bill validator, a touch screen controller, a button controller, a lamp controller, a display controller, a display, a printing device, a coin acceptor, a player tracking device, and a card reader.

7. The method in accordance with claim 1, including the step of:

authenticating said new operating code before transmitting said new operating code to said peripheral device.

8. The method in accordance with claim 1, wherein said first signal transmitted from said peripheral device to said gaming machine controller identifies said peripheral device as a download device requiring said new operating code to enable its complete operation.

9. The method in accordance with claim 1, including the step of:

periodically verifying said new operating code transmitted to said peripheral device, including transmitting said new operating code from said peripheral device to said gaming machine controller for comparison to the new operating code originally transmitted to said peripheral device.

10. A gaming machine adapted for presenting a game to a player once a bet has been placed and to pay a winning to the player for at least one particular predetermined outcome of the game, comprising:

a gaming machine controller;

one or more peripheral devices, at least one of said one or more peripheral devices being configured as a download device and including a peripheral device controller, wherein said at least one peripheral device configured as a download device contains resident code configured to generate a first signal for transmission to said gaming machine controller requesting new operating code for enabling operation of said at least one peripheral device configured as a download device, said resident code being insufficient to enable complete operation of said peripheral device, and said new operating code adapted to enable the complete operation of said peripheral device and containing a least a portion of operating code that is different from any operating code previously used by said peripheral device; and a memory device accessible by said at least one peripheral device configured as a download device, said memory device configured to store said new operating code downloaded to said at least one peripheral device configured as a download device for enabling the operation of said at least one peiipheral device configured as a download device.

11. The gaming machine in accordance with claim 10 including a read-only memory associated with said at least one peripheral device configured as a download device for storing said resident code.

12. The gaming machine in accordance with claim 10 wherein said at least one peripheral device configured as a download device is selected from the group consisting of: a bill validator, a touch screen controller, a button controller, a lamp controller, a display controller, a display, a printing device, a coin acceptor, a player tracking device, and a card reader.

13. The gaming machine in accordance with claim 10 wherein said at least one peripheral device configured as a download device is configured as a USB device.

14. The gaming machine in accordance with claim 10 wherein said gaming machine controller comprises a master gaming controller.

15. The gaming machine in accordance with claim 10 wherein said gaming machine is adapted to permit said new operating code to be downloaded to said peripheral device without needing to physically access said peripheral device.

16. The gaming machine in accordance with claim 10 wherein said gaming machine comprises a plurality of peripheral devices configured as download devices, wherein said resident code stored at each said peripheral device is configured to generate a signal for transmission to said gaming machine controller requesting said new operating code for enabling operation of each said peripheral device respectively, said resident code being insufficient to enable complete operation of said respective peripheral device, and said new operating code adapted to enable the complete operation of said respective peripheral device and containing a least a portion of operating code that is different from any operating code previously used by said respective peripheral device.

17. The gaming machine in accordance with claim 16 wherein said gaming machine is adapted such that respective new operating code or codes for said plurality of peripheral devices is delivered to more than one of said plurality of peripheral devices at the same time.

18. The gaming machine in accordance with claim 17 wherein said gaming machine is adapted such that said respective new operating code or codes for said plurality of peripheral devices is delivered to all of said plurality of peripheral devices at the same time.

19. A method of providing operating code to a peripheral device of a gaming machine having a gaming machine controller and a peripheral device with an associated device controller and a data storage device, said gaming machine adapted to play a game for a player once a bet has been placed and to pay a winning to the player for at least one particular predetermined outcome of the game, the method comprising:

initiating operation of said gaming machine;

transmitting a first signal from said peripheral device to said gaming machine controller;

authenticating new operating code for said peripheral device, said new operating code adapted to control the operation of said peripheral device and containing a least a portion of code that is different from any operating code previously used by said peripheral device;

transmitting said new operating code to said peripheral device in response to said first signal;

verifying said new operating code, including transmitting said new operating code from said peripheral device to said gaming machine controller for comparison to the new operating code originally transmitted to said peripheral device, storing said new operating code at said data storage device of said peripheral device; and executing said new operating code with said device controller of said peripheral device to enable the operation of said peripheral device.

20. The method in accordance with claim 19, wherein said authenticating step is accomplished with a file verification procedure.

21. The method in accordance with claim 19, wherein the entirety of said method is performed without physically accessing said peripheral device.

22. A gaming system adapted to download new operating code to a gaming machine peripheral device, comprising:

at least one game control device;

at least one gaming machine adapted for presenting a game to a player once a bet has been placed and to pay a winning to the player for at least one particular predetermined outcome of the game, said at least one gaming machine having at least one peripheral device configured as a download device and containing resident code configured to generate a first signal for transmission to said at least one game control device requesting said new operating code for enabling operation of said peripheral device, wherein said resident code is insufficient to enable a complete operation of said peripheral device and said new operating code is adapted to enable the complete operation of said peripheral device and contains a least a portion of operating code that is different from any operating code previously used by said peripheral device; and a communication link between said at least one game control device and said at least one gaming machine.

* * * * *